US010596803B2

(12) United States Patent
Crear et al.

(10) Patent No.: US 10,596,803 B2
(45) Date of Patent: Mar. 24, 2020

(54) CALIBRATION SYSTEMS FOR CALIBRATING RECOATER DEVICES OF ADDITIVE MANUFACTURING SYSTEMS AND RELATED PROGRAM PRODUCTS

(71) Applicant: General Electric Company, Schnectady, NY (US)

(72) Inventors: Donnell Eugene Crear, Simpsonville, SC (US); Mikhail Pavlov, Dietikon (CH); Felix Martin Gerhard Roerig, Baden (CH); Dean Andrew Snelling, Jr., Greenville, SC (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 15/608,231

(22) Filed: May 30, 2017

(65) Prior Publication Data

US 2018/0348367 A1    Dec. 6, 2018

(51) Int. Cl.
| | | |
|---|---|---|
| *G01S 17/08* | (2006.01) | |
| *B33Y 40/00* | (2020.01) | |
| *B33Y 50/02* | (2015.01) | |
| *B33Y 30/00* | (2015.01) | |
| *B29C 64/393* | (2017.01) | |
| *B29C 64/307* | (2017.01) | |
| *B33Y 10/00* | (2015.01) | |
| *B29C 64/153* | (2017.01) | |

(52) U.S. Cl.
CPC ............ *B33Y 40/00* (2014.12); *B29C 64/307* (2017.08); *B29C 64/393* (2017.08); *B33Y 30/00* (2014.12); *B33Y 50/02* (2014.12); *B29C 64/153* (2017.08); *B33Y 10/00* (2014.12)

(58) Field of Classification Search
None
See application file for complete search history.

(56) References Cited

U.S. PATENT DOCUMENTS 7,847,212 B2    12/2010  Renz et al.
8,105,527 B2 *   1/2012  Wahlstrom ............. B33Y 40/00
                                                   264/401
(Continued)

FOREIGN PATENT DOCUMENTS

WO        2016085334 A2    6/2016

*Primary Examiner* — Nathan T Leong
(74) *Attorney, Agent, or Firm* — Dale Davis; Hoffman Warnick LLC

(57) ABSTRACT

Additive manufacturing systems (AMS) are disclosed. The AMS may include a build plate positioned directly on a movable build platform, and a recoater device positioned above the build plate. The recoater device may include a blade. Additionally, the AMS may include a calibration system operably connected to the recoater device. The calibration system may include at least one measurement device coupled or positioned adjacent to the recoater device, and at least one computing device operably connected to the measurement device(s). The computing device(s) may be configured to calibrate the recoater device by adjusting a height of the blade of the recoater device relative to a reference surface of a component of the AMS in response to determining a pre-build distance between the blade of the recoater device and the reference surface differs from a desired distance. The pre-build distance may be determined using the measurement device(s).

14 Claims, 7 Drawing Sheets

(56) References Cited

U.S. PATENT DOCUMENTS

| | | |
|---|---|---|
| 9,233,507 B2 | 1/2016 | Bibas |
| 2015/0130100 A1 | 5/2015 | Fiegener |
| 2015/0258626 A1 | 9/2015 | Seufzer et al. |
| 2015/0273583 A1 | 10/2015 | Bumgardner |
| 2016/0114432 A1 | 4/2016 | Ferrar et al. |
| 2016/0136730 A1 | 5/2016 | McMurtry et al. |
| 2016/0282850 A1 | 9/2016 | Capobianco, Jr. |
| 2016/0302469 A1 | 10/2016 | Din et al. |
| 2016/0303806 A1 | 10/2016 | Mercelis |

\* cited by examiner

CALIBRATION SYSTEMS FOR CALIBRATING RECOATER DEVICES OF ADDITIVE MANUFACTURING SYSTEMS AND RELATED PROGRAM PRODUCTS

BACKGROUND

The disclosure relates generally to additive manufacturing systems, and more particularly, to a calibration system for calibrating recoater devices of the additive manufacturing systems and related program products for calibrating the recoater devices.

Components or parts for various machines and mechanical systems may be built using additive manufacturing systems. Additive manufacturing systems may build such components by continuously layering powder material and performing a material transformation process, such as sintering or melting, on the powder material. The material transformation process may alter the physical state of the powder material from a granular composition to a solid material to build the component. The components built using the additive manufacturing systems have nearly identical physical attributes as conventional components typically made by performing machining processes on stock material. However, these components can include certain geometrical features that can only be obtained through additive manufacturing methods.

Conventional additive manufacturing systems include at least one, and more specifically, two or more melting or energy emitting devices to increase the speed of building components, and to allow the additive manufacturing systems to form more complex geometries and/or features on the components. Each energy emitting device may work on and/or form distinct regions of the component. However, based on the operational capabilities or characteristics of the energy emitting devices, and/or the features of the component being built, each energy emitting device may work in a similar region of the component as well. The portion worked on by each energy emitting device is commonly referred to as the interlacing region of the component. While the interlacing region may be formed using multiple, distinct energy emitting devices, it is desired that the interlacing region of the component appear to be uniform with the other regions formed only by a single energy emitting device (e.g., material transformation quality/accuracy), and/or appear to have only been formed by a single energy emitting device (e.g., material transformation uniformity).

A variety of factors and/or operations may affect the build-uniformity in the interlacing region of the component formed by additive manufacturing systems that include multiple energy emitting devices. For example, the thickness of the powder material deposited on the build plate or built portion of the component may affect the material transformation quality/accuracy in the interlacing region of the component. If the thickness of the deposited powder material is greater than a desired thickness for forming the component, then the deposited powder material may extend above a desired, and/or predetermined plane for the energy emitting device. As a result, the energy emitting devices may not be capable of transforming all of the powder material, and the interlacing region of the component may include untransformed or unchanged powder material and/or an incomplete component.

Conversely, if the thickness of the deposited powder material is less than the desired thickness for forming the component, then the deposited powder material may extend below the desired, and/or predetermined plane for the energy emitting device. As a result, the energy emitting devices may over transform or double transform (e.g., double sinter) portions of the powder material. That is, if the thickness of the deposited powder material in the interlacing region is less than the desired thickness, and the deposited powder material is below the desired plane, than the energy emitting devices may transform beyond their desired area within the interlacing region, and portions of the powder material in the interlacing region may be undesirably exposed to both energy emitting devices during the build process. As a result, the interlacing region of the component may include structurally inferior areas or portions (e.g., double-sintered portions), which may reduce the operational efficiencies and/or operational life of the component built by the additive manufacturing systems. As such, it is crucial that the powder material deposited on the build plate or built portion of the component includes a thickness that is equal to a desired thickness for additive manufacturing systems.

SUMMARY

A first aspect of the disclosure provides an additive manufacturing system including a build plate positioned directly on a movable build platform, the build plate configured to receive a powder material; a recoater device positioned above the build plate, the recoater device including a blade; and a calibration system operably connected to the recoater device, the calibration system including: at least one measurement device coupled to the recoater device or positioned adjacent the recoater device; and at least one computing device operably connected to the at least one measurement device, the at least one computing device configured to calibrate the recoater device by: adjusting a height of the blade of the recoater device relative to a reference surface in response to determining a pre-build distance between the blade of the recoater device and the reference surface differs from a desired distance, wherein the pre-build distance is determined using the at least one measurement device.

A second aspect of the disclosure provides a calibration system operably connected to a recoater device of an additive manufacturing system, the calibration system including: at least one measurement device coupled to the recoater device or positioned adjacent the recoater device; and at least one computing device operably connected to the at least one measurement device, the at least one computing device configured to calibrate the recoater device by: adjusting a height of a blade of the recoater device relative to a reference surface of the additive manufacturing system in response to determining a pre-build distance between the blade of the recoater device and the reference surface differs from a desired distance, wherein the pre-build distance is determined using the at least one measurement device.

A third aspect of the disclosure provides a computer program product including program code stored on a non-transitory computer readable storage medium, which when executed by at least one computing device, causes the at least one computing device to calibrate a recoater device of an additive manufacturing system by performing processes including: adjusting a height of a blade of the recoater device relative to a reference surface of the additive manufacturing system in response to determining a pre-build distance between the blade of the recoater device and the reference surface differs from a desired distance.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant machine components within additive manufacturing systems. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to additive manufacturing systems, and more particularly, to a calibration system for calibrating recoater device of the additive manufacturing system and related program products for calibrating the recoater device.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
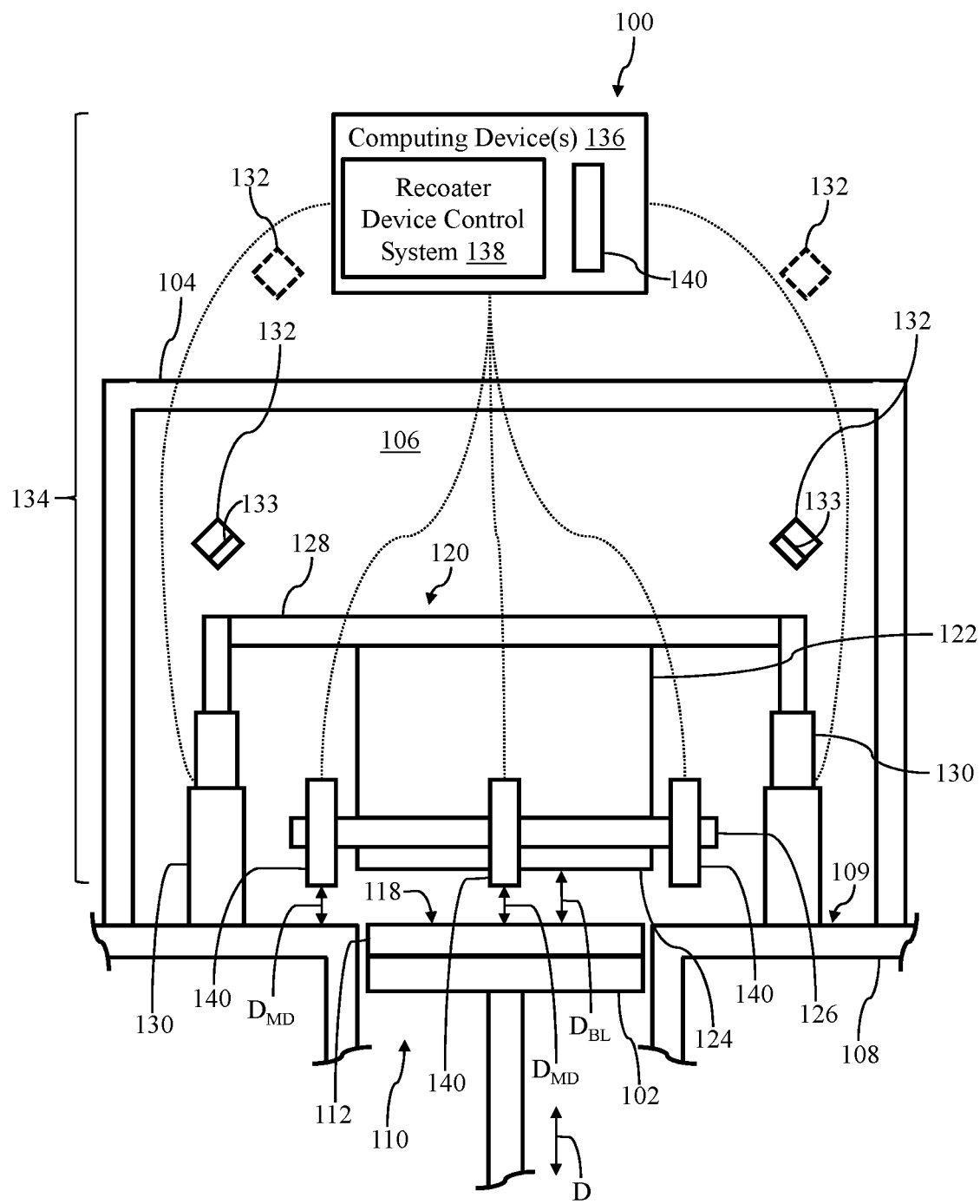
FIG. 1 shows a front view of an additive manufacturing system and a calibration system including proximity sensors coupled to a recoater device of the additive manufacturing system, according to embodiments.

FIG. 1 shows a front view of an additive manufacturing system 100. Specifically, FIG. 1 shows a front view of additive manufacturing system 100 with a portion of an enclosure or build chamber removed to exposed internal components and/or features of additive manufacturing system 100. As discussed in detail herein, additive manufacturing system 100 may include a calibration system configured to calibrate a recoater device of additive manufacturing system 100. Additive manufacturing system 100 including the calibration system and the process of calibrating the recoater device of additive manufacturing system 100, as discussed herein, may significantly improve the quality of a component built from powder material by additive manufacturing system 100.

As shown in FIG. 1, additive manufacturing system 100 (hereafter, "AMS 100") may include a movable build platform 102 (hereafter, "build platform 102"). Build platform 102 may be positioned within a build chamber 104 of AMS 100. That is, build platform 102 may be at least partially positioned or disposed within a chamber or cavity 106 of build chamber 104, such that build chamber 104 may substantially surround build platform 102. Additionally, build platform 102 may be positioned adjacent and/or within a support table 108 of AMS 100. As shown in FIG. 1, support table 108 may include an exposed surface 109 positioned within cavity 106 and an opening 110 configured to receive and/or substantially surround build platform 102. As discussed herein, support table 108 may receive, contact, and/or support various components of AMS 100, and/or may be coupled to and/or may be included as part of build chamber 104, such that build chamber 104 and support table 108 substantially define cavity 106. Additionally as discussed herein, support table 108, and more specifically exposed surface 109 may be utilized in a calibration process, as discussed herein.

As shown in FIG. 1, build platform 102 may be configured to receive a build plate 112. Specifically, build plate 112 may be positioned directly on and/or above build platform 102 and may extend into and/or adjacent cavity 106. In a non-limiting example shown in FIG. 1, build platform 102 may be configured to move in a direction (D) for adjusting the height of build platform 102 and/or build plate 112. As discussed herein, build platform 102 may move in the direction (D) during a building process performed by AMS 100 to build a component from a powder material (see, FIG. 6) on build plate 112. In non-limiting examples, build platform 102 may be configured to move in the direction (D) during a building process performed by AMS 100 by any suitable system, device and/or mechanism including, but not limited to, hydraulic and/or actuator systems. In another non-limiting example, build platform 102 may be coupled to and/or in electronic communication with a leveling system (not shown). The leveling system may be configured to move build platform 102 in the direction (D), as well as, adjust the tilt and/or inclination of build platform 102 to position or orient the build platform 102 to be substantially level, planarly aligned with other components of AMS 100 and/or to include a desired inclination for the calibration and/or component build processes, as discussed herein.

Build platform 102 may be formed from any suitable material that may receive and/or support the powder material and the component formed from the powder material, as discussed herein. Additionally, the size and/or geometry of build platform 102 of AMS 100 may be dependent on, at least in part, the amount of powder material utilized by AMS 100 to form the component, the size of the component, the geometry of the component formed by AMS 100, and/or the size of build plate 112 positioned directly on build platform 102.

Build chamber 104 may at least partially and/or substantially surround build platform 102 and build plate 112 positioned directly on build platform 102. Build chamber 104, along with support table 108, may be formed as any suitable structure and/or enclosure including build cavity 106 that may receive build platform 102, build plate 112 and/or additional components of AMS 100 that may be utilized to form a component. Build chamber 104 may be formed from any suitable material that may be capable of including and/or supporting the features of AMS 100. In non-limiting examples, build chamber 104 may be formed from metals, metal alloys, ceramics, polymers and other materials including similar physical, material and/or chemical characteristics. Additionally, the size and/or geometry of build chamber 104 may be dependent on, at least in part, the size and/or the geometry of the component formed by AMS 100.

Build plate 112 may be positioned on, retained on and/or releasably coupled to build platform 102 and may be utilized by AMS 100 to build components, as discussed herein. Build plate 112 may be positioned directly on, and releasably coupled to build platform 102 of AMS 100 using any suitable coupling technique and/or mechanism. For example, build plate 112 may be releasably coupled to build platform 102 using bolts, screws, clips, retention pins and the like. As a result of being releasably coupled to build platform 102, build plate 112 may move in the direction (D) along with build platform 102.

Build plate 112 may also include a build surface 118 that may receive powder material for building the component (see, FIG. 6) directly on build surface 118, as discussed herein. As shown in FIG. 1, build surface 118 may be in substantial planar alignment, substantially level and/or substantially even with support table 108 of AMS 100 prior to building the component from the powder material (see, FIG. 6) (e.g., pre-build state). As discussed in a non-limiting example herein, aligning build surface 118 of build plate 112 with support table 108 of AMS 100 may aid in calibrating the recoater device of AMS 100.

Build plate 112 may be made from any suitable material capable of withstanding the processes for building a component using AMS 100. In non-limiting examples, build plate 112 may be formed from stainless steel, aluminum, titanium, nickel, cobalt or iron alloys, or any other material having similar physical, material and/or chemical characteristics. Additionally, the size and/or geometry of build plate 112 of AMS 100 may be dependent on, at least in part, the amount of powder material used by AMS 100 to form the component, the size of the component, the geometry of the component formed by AMS 100, and/or the size of build platform 102 configured to receive and releasably couple build plate 112.

AMS 100 may also include a recoater device 120. As shown in FIG. 1, recoater device 120 may be positioned within cavity 106. Specifically, recoater device 120 of AMS 100 may be positioned within cavity 106, and/or may be surrounded by build chamber 104 and support table 108. Recoater device 120 may also be positioned above, and may be (at least partially) aligned with build platform 102, support table 108, and/or build plate 112 positioned directly on build platform 102. As discussed herein, recoater device 120 may include, be coupled to, and/or operably connected to various components, devices and/or systems that may be configured to deposit powder material on build surface 118 of build plate 112, for subsequent transformation (e.g., sintering) to build component layer-by-layer using AMS 100.

Recoater device 120 may include a powder material reservoir tank 122 (hereafter, "reservoir tank 122"). As shown in FIG. 1, reservoir tank 122 may be positioned within cavity 106 defined by build chamber 104, and may be positioned above or below build platform 102 and build plate 112, respectively. Reservoir tank 122 may be formed as any suitable component that may be configured to receive, contain and/or hold powder material (e.g., metal, polymer, ceramic and the like) that may be utilized in the build process to form build component on build plate 112, as discussed herein. In a non-limiting example, reservoir tank 122 may be formed from a tank, container, vessel, receptacle, chamber, hopper and/or the like. Additionally in a non-limiting example, reservoir tank 122 may be configured to deposit the powder material on build plate 112 for forming the build component layer-by-layer. Reservoir tank 122 may deposit the powder material on build plate 112 using any suitable material deposition component or device, and may deposit the powder material using any suitable material deposition technique or process.

As shown in FIG. 1, recoater device 120 may also include at least one blade 124. Blade 124 of recoater device 120 may be positioned below reservoir tank 122. That is, blade 124 may be positioned below reservoir tank 122, and may be positioned between build plate 112 and reservoir tank 122. In the non-limiting example, blade 124 may also be positioned above and directly adjacent build plate 112 positioned directly on build platform 102. Blade 124 may be coupled to and/or affixed to reservoir tank 122 via a blade holder 126 to form recoater device 120. That is, blade holder 126 may be positioned between, and affixed or coupled to each of reservoir tank 122 and blade 124, respectively, and may consequentially couple blade 124 to reservoir tank 122. As a result, and as discussed herein, when recoater device 120 moves and the powder material stored in reservoir tank 122 is deposited on build plate 112, blade 124 may also move with recoater device 120 and/or reservoir tank 122. Blade 124 of recoater device 120 may level the powder material deposited by reservoir tank 122 during the build process performed by AMS 100. Specifically, blade 124 may spread, level, smooth, and/or flatten the powder material after it is deposited by reservoir tank 122 to ensure the deposited layer of powder material includes a desired thickness before the powder material is transformed, as discussed herein. In non-limiting examples, blade 124 of recoater device 120 may be formed from any suitable component, and any suitable material, that may be configured to level the deposited powder material to form an even, desired thickness for the deposited powder material prior to material transformation. In non-limiting examples, blade 124 may be formed from ceramic material, stainless steel, rubber, sintered powder material, and/or may be formed as a brush including a plurality of bristles. Although only a single blade 124 is shown, it is understood that recoater device 120 may include more blades 124 and/or blade holders 126.

Recoater device 120 may also be coupled to a track system 128 of AMS 100. Specifically, recoater device 120 may be coupled to track system 128 of AMS 100 positioned within cavity 106, and/or surrounded by build chamber 104 and support table 108, respectively. In the non-limiting example shown in FIG. 1, track system 128 may be positioned substantially above recoater device 120, and reservoir tank 122 of recoater device 120 may be coupled directly to track system 128. In other non-limiting examples (not shown), distinct portions or components of recoater device 120 (e.g., blade holder 126) may be coupled to track system 128. Track system 128 may be configured to adjust a position of and/or move recoater device 120 within build chamber 104 of AMS 100, over build plate 112, during the component build process performed by AMS 100, as discussed herein. Track system 128 may be formed as any suitable component, device and/or system that may be configured to adjust the position and/or move recoater device 120. For example, track system 128 may be formed as a four-post track system and cross-bar support that may be configured to move recoater device 120 in a direction in-and-out of the page, over build plate 112, during the component build process discussed herein.

AMS 100 may also include at least one actuator 130. Specifically, as shown in FIG. 1, AMS 100 may include two distinct actuators 130 positioned within cavity 106, and coupled directly to track system 128. Continuing the example discussed above, where track system 128 includes a four-post track system, actuators 130 of AMS 100 may form each post of track system 128, or alternatively, may be coupled to and positioned between distinct posts (not shown) and track system 128, respectively. Additionally in the non-limiting example shown in FIG. 1, actuators 130 may be coupled to, supported by, and/or positioned on support table 108 of AMS 100. Actuator 120 may be any suitable actuator, and/or actuating device that may be configured to move track system 128 and recoater device 120, respectively, in a direction (D) to calibrate recoater device 120, as discussed herein. For example, recoater device 120 may be formed as a linear drive, hydraulic or telescoping actuator that may be configured to move track system 128, and recoater device 120 coupled to track system 128, in the direction (D) to calibrate recoater device 120 of AMS 100 prior to and/or during a build process, as discussed herein.

Although shown and discussed herein to include track system 128 and actuator 130, AMS 100 may include any suitable component and/or system configured to adjust the position of recoater device 120 when performing the calibration process for recoater device 120 and/or component build process, as discussed herein. For example, recoater device 120 may be coupled and/or fixed to a moveable armature that may adjust the position of recoater device 120 in the various required directions (e.g., direction (D), a direction in-and-out of the page) to perform the calibration process for recoater device 120 and/or component build process, as discussed herein. Additionally, the number of actuator(s) 130 of AMS 100 and/or the position of actuator(s) 130 shown in FIG. 1 may be merely illustrative. As such, AMS 100 may include more or fewer actuator(s) 130 than those depicted by example in FIG. 1. Furthermore in other non-limiting examples discussed herein, actuator(s) 130 may be coupled to distinct portions and/or component (e.g., recoater device 120, blade 124, blade holder 126, side walls of chamber 104 and so on) of AMS 100 (see, FIG. 5).

AMS 100 may also include at least one energy emitting device 132. As discussed herein, energy emitting device(s) 132 may be any device configured to perform a material transformation process (e.g., sintering, melting) on various powder materials (e.g., metal, polymer, ceramic and the like) used to form the component on build plate 112. As shown in FIG. 1, energy emitting device(s) 132 of AMS 100 may be positioned substantially above build platform 102 and/or build plate 112 positioned directly on build platform 102. Additionally as shown in FIG. 1, energy emitting device(s) 132 may be positioned above recoater device 120. In the non-limiting example shown in FIG. 1, energy emitting device(s) 132 may be positioned within build chamber 104, and may be coupled to and/or fixed to build chamber 104. In another non-limiting example, energy emitting device(s) 132 may be positioned outside of and/or above build chamber 104 of AMS 100 (see, energy emitting device(s) 132 shown in phantom). Energy emitting device(s) 132 of AMS 100 may include at least one adjustable mirror 133. The position and/or inclination of mirror(s) 133 of energy emitting device(s) 132 may be (continuously) adjusted during the component build processes to direct and/or move the emitted energy (e.g., laser beam, electron beam) over build plate 112 to form the component, as discussed herein. In another non-limiting example, energy emitting device(s) 132 may be configured to at least partially rotate in order to form component on build plate 112 by performing build process discussed herein. In additional non-limiting examples, energy emitting device(s) 132 may be coupled to a distinct track system (not shown) that may be configured to move energy emitting device(s) 132, individually, in various directions when performing build process discussed herein.

Energy emitting device(s) 132 may be any suitable device configured to and/or capable of forming component on build plate 112 from powder material. Specifically, energy emitting device(s) 132 may be configured to and/or capable of transforming the powder material (e.g., sintering, melting), layer-by-layer (see, FIG. 6), to form a component, as discussed herein. In a non-limiting example shown in FIG. 1, energy emitting device(s) 132 may be any suitable laser or laser device configured to emit light capable of transforming the powder material. In other non-limiting examples (not shown), energy emitting device(s) 132 may include any other suitable radiant energy or irradiation device (e.g., electron beam) configured to transform the powder material including, but not limited to, a heat source, a radiation-emitting device, a microwave-emitting device and the like.

Two energy emitting devices 132 are shown and discussed herein with respect to AMS 100. However, it is understood that the number of energy emitting devices of AMS 100 shown in the figures is merely illustrative. As such, AMS 100 may include more or fewer energy emitting device(s) 118 than the number depicted and discussed herein.

During the component build process, powder or granular material may be added to build surface 118 of build plate 112 using recoater device 120. Specifically, reservoir tank 122 of recoater device 120 may move over (e.g., direction in-and-out of the page) build platform 102/build plate 112, and may deposit powder material on build surface 118 of build plate 112. Additionally, and substantially simultaneous to the deposition, blade 124 of recoater device 120 may also spread, level, smooth, and/or flatten the deposited powder material on build plate 112 to have a substantially planar surface and/or to include a predetermined, desired thickness. That is, blade 124 of recoater device 120 may substantially define the surface of the deposited powder material when spreading the powder material. Once deposited and leveled by recoater device 120, the powder material may subsequently be transformed (e.g., sintered, melted) by energy emitting device(s) 132 to form a layer of build component.

Once the layer of powder material is transformed by energy emitting device(s) 132, build platform 102, and build plate 112 positioned directly on and coupled to build platform 102, may be adjusted and/or moved in a direction (D), within opening 110, away from and/or further below recoater device 120. The deposition, leveling, material transformation, and build platform 102 adjustment process may be continuously performed to build component layer-by-layer. Once the component is built on build surface 118 of build plate 112, the component may be removed and build plate 112, build plate 112 may be reused by AMS 100 and/or undergo another build process, as discussed herein, to have one or more distinct components built on build surface 118.

As shown in FIG. 1, AMS 100 may also include a calibration system 134. As discussed herein, calibration system 134, and its various components, may be operably connected to portions, components, devices, and/or systems of AMS 100 (e.g., recoater device 120, actuator 130, and so on) to calibrate recoater device 120. Additionally as discussed in detail herein, calibration system 134 and the processes of calibrating recoater device 120 of AMS 100 using calibration system 134 may improve the quality of a component built from powder material by AMS 100 by ensuring the thickness of the powder material deposited by recoater device 120 is consistently equal to and the predetermined, desired thickness, and ultimately the surface of the deposited powder material is formed at a desired, and/or predetermined plane for energy emitting device(s) 132.

Calibration system 134 may include at least one computing device 136 configured to calibrate recoater device 120. Computing device(s) 136 may be hard-wired, wirelessly and/or operably connected to and/or in communication with various components of AMS 100 via any suitable electronic and/or mechanic communication component or technique. Specifically, computing device(s) 136 of calibration system 134 may be in electrical communication and/or operably connected to actuator(s) 130 and/or measurement device(s) of AMS 100, discussed herein. Computing device(s) 136, and its various components discussed herein, may be a single stand-alone system that functions separate from an operations system of AMS 100 (e.g., computing device) (not shown) that may control and/or adjust at least a portion of operations and/or functions of AMS 100, and its various components (e.g., build platform 102, energy emitting device(s) 132, actuator(s) 130, track system 128 and so on). Alternatively, computing device(s) 136 and its components may be integrally formed within, in communication with and/or formed as a part of a larger control system of AMS 100 (e.g., computing device)(not shown) that may control and/or adjust at least a portion of operations and/or functions of AMS 100, and its various components.

In various embodiments, computing device(s) 136 can include a recoater device control system 138 (hereafter, "control system 138") for calibrating recoater device 120. As a result of computing device(s) 136 being in operable communication with actuator(s) 130, control system 138 may also be in electronic communication and/or operably connected to actuator(s) 130 of AMS 100, and may be configured to operate and/or actuate actuator(s) 130. That is, and as discussed herein, computing device(s) 136 and/or control system 138 may be configured to calibrate recoater device 120 by adjusting the distance between recoater device 120 and a reference surface (e.g., exposed surface 109, build surface 118 and so on) for component(s) of AMS 100, based on predetermined and/or obtained distances or spaces between blade 124 and the reference surface, to improve the quality of a component built from powder material by AMS 100.

Additionally, calibration system 134 may also include at least one measurement device 140. Measurement device(s) 140 may be in electronic communication and/or operably connected to computing device(s) 136 and/or control system 138, and may be configured to provide measured data to computing device(s) 136 and/or control system 138 to be utilized in the calibration process discussed herein. Additionally, measurement device(s) 140 may be positioned within and/or adjacent AMS 100 to determine a distance ($D_{BL}$) between blade 124 of recoater device 120 and a reference surface in order to recalibrate recoater device 120, as discussed herein. In a non-limiting example, measurement device(s) 140 may be positioned within cavity 106 defined by build chamber 104 and/or support table 108. Additionally in the non-limiting example shown in FIG. 1, measurement device(s) 140 may be positioned on, and/or coupled to recoater device 120, and more specifically, to blade holder 126 of recoater device 120. As a result of being coupled to recoater device 120, measurement device(s) 140 may also be positioned substantially above and/or in substantial alignment with build platform 102, support table 108, and/or build plate 112.

Measurement device(s) 140 of calibration system 134 may be any suitable measurement device, component, or sensor configured to detect and/or determine distance ($D_{BL}$) between blade 124 of recoater device 120 and a reference surface of component(s) of AMS 100, as discussed herein. For example, and as shown in FIG. 1, measurement device(s) 140 coupled to recoater device 120, and more specifically blade holder 126 of recoater device 120, may be a proximity sensor(s). In the non-limiting example, the proximity sensor(s) forming measurement device(s) 140 may emit a signal (e.g., electromagnetic field) toward exposed surface 109 of support table 108 and/or build surface 118 of build plate 112 (e.g., reference surfaces) to determine the distance between blade 124 of recoater 120 and the reference surfaces to recalibrate recoater device 120, as discussed herein. In other non-limiting examples, measurement device(s) 140 may formed or configured as other measurement devices or sensors, such as, camera systems (see, FIG. 3) and other emitter/receiver sensors (e.g., photoelectric sensors)(see, FIG. 4).

In the non-limiting example shown in FIG. 1, three measurement device(s) 140 are shown. However, in other non-limiting examples, calibration system 134 of AMS 100 may include more or fewer measurement device(s) 140, so long as measurement device(s) 140 may be configured to provide computing device(s) 136, and/or control system 138, with information or data relating the distance ($D_{BL}$) between blade 124 of recoater device 120 and the reference surface of AMS 100 to calibrate recoater device 120, as discussed herein. That is, the number of measurement device(s) 140 shown in FIG. 1 is merely illustrative and non-limiting. Additionally, in the non-limiting example of FIG. 1, measurement device(s) 140 may be coupled directly to recoater device 120 (e.g., blade holder 126). In other non-limiting examples discussed herein (see, FIGS. 2-4), measurement device(s) 140 may be positioned within or adjacent build chamber 104, and/or may be coupled to various distinct components of AMS 100 in order to determine the distance ($D_{BL}$) between blade 124 of recoater device 120 and the reference surface(s) of AMS 100, as discussed herein.

The calibration process for calibrating recoater device 120 of AMS 100 may now be discussed. In a non-limiting example, the calibration process for calibrating recoater device 120 may be performed at a "pre-build" stage. The pre-build stage may be before a powder material is deposited on build plate 112 by recoated device 120, and before any portion of component is built on build plate 112. By performing the calibration process for calibrating recoater device 120 in the pre-build stage (e.g., before beginning to build the component from powder material on build plate 112), it may ensure that recoater device 120 is positioned within AMS 100 to deposit and/or level each layer of the powder material to include a desired thickness. Leveling the powder material to have the desired thickness for the powder material may result in the powder material being formed to include a desired, and/or predetermined plane for energy emitting device(s) 132 during the component build process. This may in turn improve the build quality of the component built by AMS 100.

A distance ($D_{BL}$) between blade 124 of recoater device 120 and the reference surface may first be determined when performing a calibration process to calibrate recoater device 120. In the non-limiting example discussed herein, the reference surface used to calibrate recoater device 120 may be build surface 118 of build plate 102. However, in other non-limiting examples, the reference surface may refer to and/or may include other exposed surfaces aligned with and/or positioned adjacent measurement device(s) 140 of calibration system 134. Additional non-limiting examples of the reference surface may include exposed surface 109 of support table 108, a surface of movable build platform 102 (where build plate 112 is not positioned on build platform 102), and/or the top or exposed surface of a portion of the component being formed by AMS 100.

Calibration system 134 of AMS 100, and more specifically measurement device(s) 140, may determine the distance ($D_{BL}$) between blade 124 of recoater device 120 and build surface 118 (e.g., reference surface) of build plate 112. As discussed herein, the distance ($D_{BL}$) may be a pre-build distance between blade 124 and build surface 118 of build plate 112, prior to depositing powder material on build surface 118 of build plate 112 to form the component, as discussed herein. In non-limiting examples shown in FIG. 1, measurement device(s) 140 may determine a distance ($D_{MD}$) between measurement device(s) 140 and exposed surface 109 of support table 108 and/or build surface 118 of build plate 112, which may include build surface 118 in substantial planar alignment with exposed surface 109 of support table 108 in the pre-build stage. Additionally, it may also be known and/or predetermined how far apart, and/or spaced out blade 124 is from measurement device 140. In the non-limiting example shown in FIG. 1, blade 124 may be non-planar with, and/or may be positioned above the bottom or lowest portion of measurement device(s) 140, and a separation and/or gap between blade 124 and measurement device(s) 140 may be known and/or predetermined. Continuing the non-limiting example, once the distance ($D_{MD}$) between measurement device(s) 140 and exposed surface 109 and/or support table 108 and/or build surface 118 of build plate 112 is measured by measurement device(s) 140, and knowing the separation and/or gap between non-planar blade 124 and measurement device(s) 140, the distance ($D_{BL}$) between blade 124 of recoater device 120 and build surface 118 of build plate 112 may be determined by computing device(s) 136 and/or control system 138 of calibration system 134.

In other non-limiting examples (not shown), the bottom or lowest portion of measurement device(s) 140 may be planar and/or even with blade 124 of recoater device 120. As a result, in the non-limiting examples, the distance ($D_{MD}$) between measurement device(s) 140 and exposed surface 109 of support table 108 and/or build surface 118 of build plate 112 may be substantially similar or identical to the distance ($D_{BL}$) between blade 124 of recoater device 120 and build surface 118 of build plate 112. Additionally, the distance ($D_{MD}$) between measurement device(s) 140 and exposed surface 109 of support table 108 and/or build surface 118 of build plate 112 for each measurement device 140 may be measured and compared to determine if recoater device 120 is titled and/or uneven, and/or to determine if build surface 118 of build plate 112 positioned on build platform 102 is not substantially planar and/or even with support table 108 of AMS 100. If it is determined that recoater device 120 is titled and/or uneven, and/or it is determined that build surface 118 of build plate 112 is not planar and/or even with support table 108, recoater device 120 and/or build platform 102 may be adjusted to correct these determinations, and the distance ($D_{MD}$) between measurement device(s) 140 and exposed surface 109 of support table 108 and/or build surface 118 of build plate 112, and/or the distance ($D_{BL}$) between blade 124 of recoater device 120 and build plate 112 may be determined again.

Once the distance ($D_{BL}$) between blade 124 of recoater device 120 and build surface 118 of build plate 112 in the pre-build stage is determined, the distance ($D_{BL}$) may be compared to a desired distance for blade 124 and build surface 118 (e.g., reference surface) of build plate 112. That is, the pre-build distance ($D_{BL}$) between blade 124 and build surface 118 of build plate 112, as determined by measurement device(s) 140, may be compared to a desired distance for blade 124 and build surface 118 of build plate 112 of AMS 100, to determine if the distance ($D_{BL}$) differs from the desired distance. The desired distance for blade 124 and build surface 118 of build plate 112 may be based on operational characteristics for AMS 100 and/or build characteristics of the component built by AMS 100, as discussed herein. More specifically, the desired distance for blade 124 and build surface 118 of build plate 112 may be known, predetermined and/or calculated based on optimum, determined, and/or intended operational characteristics for AMS 100, and its various components utilized in the build process (e.g., recoater device 120, energy emitting device(s) 130 and so on), and/or build characteristics or properties of the component built by AMS 100.

In non-limiting examples, operational characteristics for AMS 100 may include, but are not limited to, the number of energy emitting device(s) 130 of AMS 100, the range of movement for energy emitting device(s) 130 (e.g., fixed but rotatable, energy emitting device track system and the like), type of energy emitting device(s) 130 of AMS 100, energy emitting device(s) 130 position within AMS 100 relative to build plate 112, size of recoater device 120, deposition rate of powder material for recoater device 120, size of build plate 112, range of motion for build platform 102 including build plate 112, and the like. In non-limiting examples, build characteristics for the component formed on build plate 112 from powder material may include, but are not limited to, the composition of the powder material, the size of the component, the features and/or geometry of the component, the number of layers of powder material deposited to form the component, and so on.

The desired distance between blade 124 and build surface 118 of build plate 112 for AMS 100 may correspond to a desired height of recoater device 120. The desired height of recoater device 120 may ensure that the powder material deposited onto build plate 112 may have or include a desired thickness, and a desired plane for the deposited powder material, which may ensure the powder material is completely transformed by energy emitting device(s) 130 of AMS 100, without material and/or compositional defect (e.g., double sintering). For example, the thickness of the powder material deposited when recoater device 120 is at the desired height with respect to build plate 112, and the powder material may be deposited to include a desired plane, which may ensure that when energy emitting device(s) 130 transform the powder material, all portions of the powder material are transformed, and/or any interlacing regions of the component built by AMS 100 are uniformly built by energy emitting device(s) 130.

If it is determined that the distance ($D_{BL}$) between blade 124 of recoater device 120 and build surface 118 of build plate 112 in the pre-build stage is similar or identical to the calculated, desired distance for blade 124 and build surface 118 of build plate 112, no adjustment to recoater device 120 may be made by calibration system 134. However, if it is determined that the pre-build distance ($D_{BL}$) between blade 124 and build surface 118 of build plate 112 differs from the calculated, desired distance for blade 124 and build surface 118 of build plate 112, calibration system 134 may calibrate recoater device 120. Calibration system 134 may calibrate recoater device 120 by adjusting a height of blade 124 of recoater device 120 relative to build surface 118 (e.g., reference surface) of build plate 112. In a non-limiting example, calibration system 134 may adjust the height blade 124 of recoater device 120 relative to build surface 118 of build plate 112 by altering the height of blade 124 until the pre-build distance ($D_{BL}$) between blade 124 and build surface 118 of build plate 112 is identical to the desired distance. Where the distance ($D_{BL}$) is greater than the desired distance, calibration system 134 may adjust and/or alter the height of blade 124 of recoater device 120 by moving recoater device 120 and/or blade 124 in the direction (D) toward and/or closer to build surface 118 of build plate 112. Alternatively where the distance ($D_{BL}$) is less than the desired distance, calibration system 134 may adjust and/or alter the height of blade 124 of recoater device 120 by moving recoater device 120 and/or blade 124 in the direction (D) away and/or further from build surface 118 of build plate 112.

Calibration system 134 may adjust the height of blade 124 and/or recoater device 120 using various components of AMS 100. In a non-limiting example shown in FIG. 1, calibration system 134, and more specifically computing device(s) 136 and/or control system 138, may be in communication with and/or operably connected to actuator(s) 130. In response to determining that calibration system 134 should calibrate recoater device 120, computing device(s) 136 and/or control system 138 of calibration system 134 may adjust the height of blade 124 and/or recoater device 120 by actuating actuator(s) 130 in the direction (D). As discussed herein, actuator(s) 130 may be coupled to track system 128, which in turn is coupled to recoater device 120. As a result, when computing device(s) 136 and/or control system 138 of calibration system 134 actuates actuator(s) 130 of AMS 100, track system 128 and recoater device 120, including blade 124, may be displaced and the height of blade 124 may be altered and/or adjusted. In the non-limiting example, computing device(s) 136 and/or control system 138 of calibration system 134 may adjust the height of blade 124 and/or recoater device 120 using actuator(s) 130 until the pre-build distance ($D_{BL}$) between blade 124 and build surface 118 of build plate 112 is identical to the desired distance.

In another non-limiting example, calibration system 134, and more specifically measurement device(s) 140, may determine that recoater device 120 is tilted and/or oriented at an inclined. Specifically, distinct measurement device(s) 140 of calibration system 134 may determine that the distance ($D_{MD}$) between measurement device(s) 140 and exposed surface 109 of support table 108 and/or build surface 118 of build plate 112 may vary as a result of recoater device 120 being tilted. In this non-limiting example, calibration system 134 may actuate a single actuator 130, or alternatively, may actuate multiple actuators 130 at distinct displacements, to adjust the height of blade 124 of recoater device 120.

Calibrating recoater device 120, and more specifically adjusting the height of blade 124 of recoater device 120, may ensure that the powder material deposited onto build plate 112 by recoater device includes the desired thickness and a desired, and/or predetermined plane for energy emitting device(s) 132 during the component build process. As discussed herein, depositing the powder material to include the desired thickness, and a desired plane for the deposited powder material, which may ensure the powder material is completely transformed by energy emitting device(s) 130 of AMS 100, without material and/or compositional defect (e.g., double sintering, metallurgical defects, and steps on the outside of the part, increased surface roughness) when performing the build process discussed herein. This may ultimately improve build quality, operational characteristics, and/or operational life of the component build by AMS 100.

FIGS. 2-5 show front views of various non-limiting examples of AMS 100. In the various non-limiting examples shown in FIGS. 2-5, AMS 100 may include measurement device(s) 140 of calibration system 134 and/or actuator(s) 130 positioned in distinct locations, and/or configured as distinct devices. The distinctions in these components of AMS 100, as well as, the distinction in performing the calibration process for these non-limiting examples are discussed in detail herein. It is understood that similarly numbered and/or named components may function in a substantially similar fashion. Redundant explanation of these components has been omitted for clarity.

Figure 2:
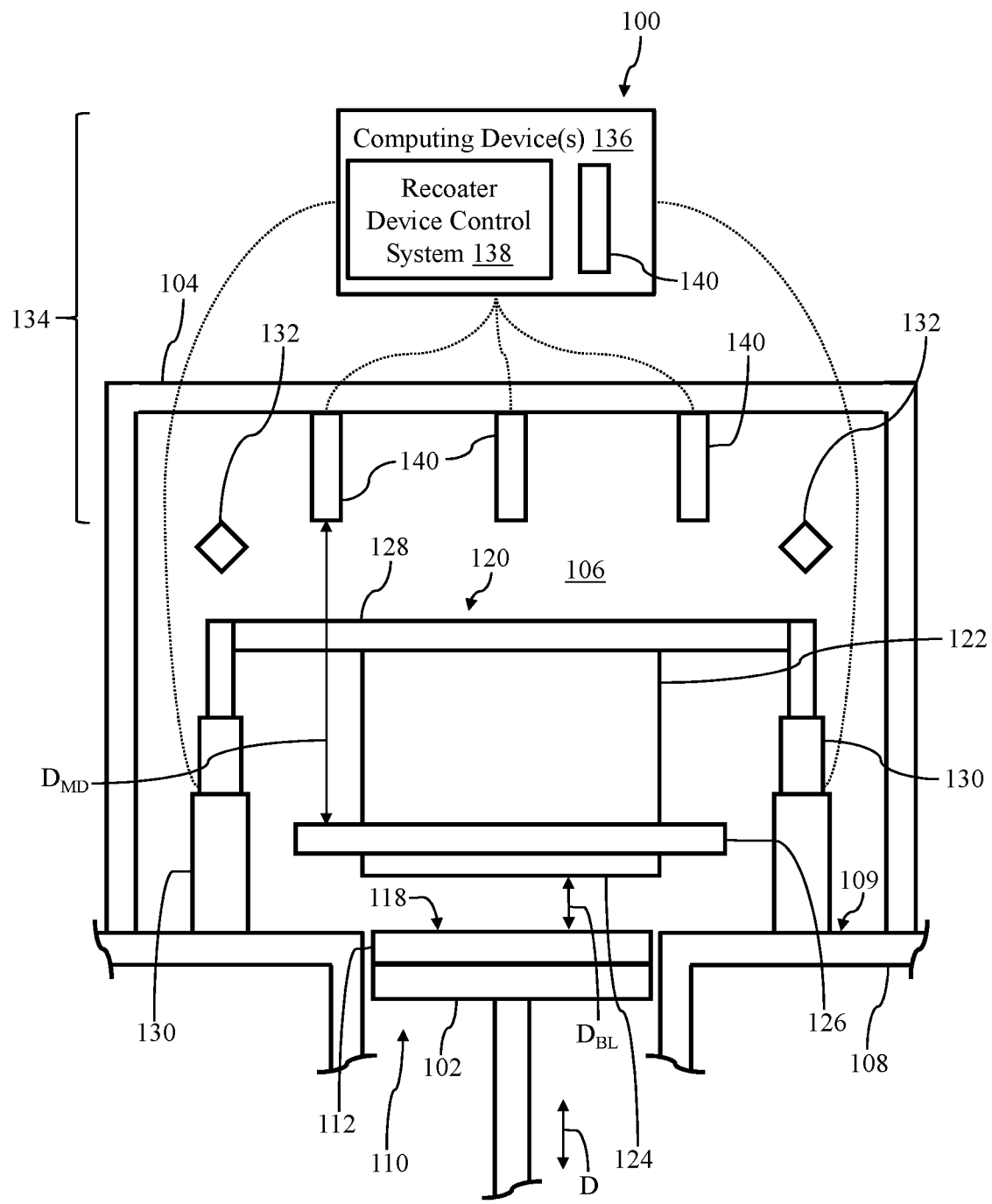
FIG. 2 shows a front view of an additive manufacturing system and a calibration system including proximity sensors positioned above a recoater device of the additive manufacturing system, according to embodiments.

Turning to FIG. 2, and similar to AMS 100 shown in FIG. 1, calibration system 134 may include measurement device(s) 140 that may be configured as proximity sensors. However, distinct from FIG. 1, measurement device(s) 140, as shown in FIG. 2, may be positioned above recoater device 120. Specifically in the non-limiting example shown in FIG. 2, measurement device(s) 140 of calibration system 134 may be coupled and/or fixed to build chamber 104, and may be positioned above and substantially aligned with recoater device 120. As a result of positioning measurement device(s) 140 above recoater device 120, the distance ($D_{MD}$) measured by measurement device(s) 140, and utilized to determine the distance ($D_{BL}$) between blade 124 and build surface 118 of build plate 112, may be a measurable distance between measurement device(s) 140 and blade 124, and/or blade holder 126 of recoater device 120. In the non-limiting example, and as similarly discussed above, it may also be known and/or predetermined how far apart, and/or spaced out (e.g., separation or gap) blade 124 is from blade holder 126 of recoater device. As such, once the distance ($D_{MD}$) between measurement device(s) 140 and blade 124 and/or blade holder 126 is measured by measurement device(s) 140, and knowing the separation between blade 124 and blade holder 126, the distance ($D_{BL}$) between blade 124 of recoater device 120 and build surface 118 of build plate 112 may be determined by computing device(s) 136 and/or control system 138 of calibration system 134.

Figure 3:
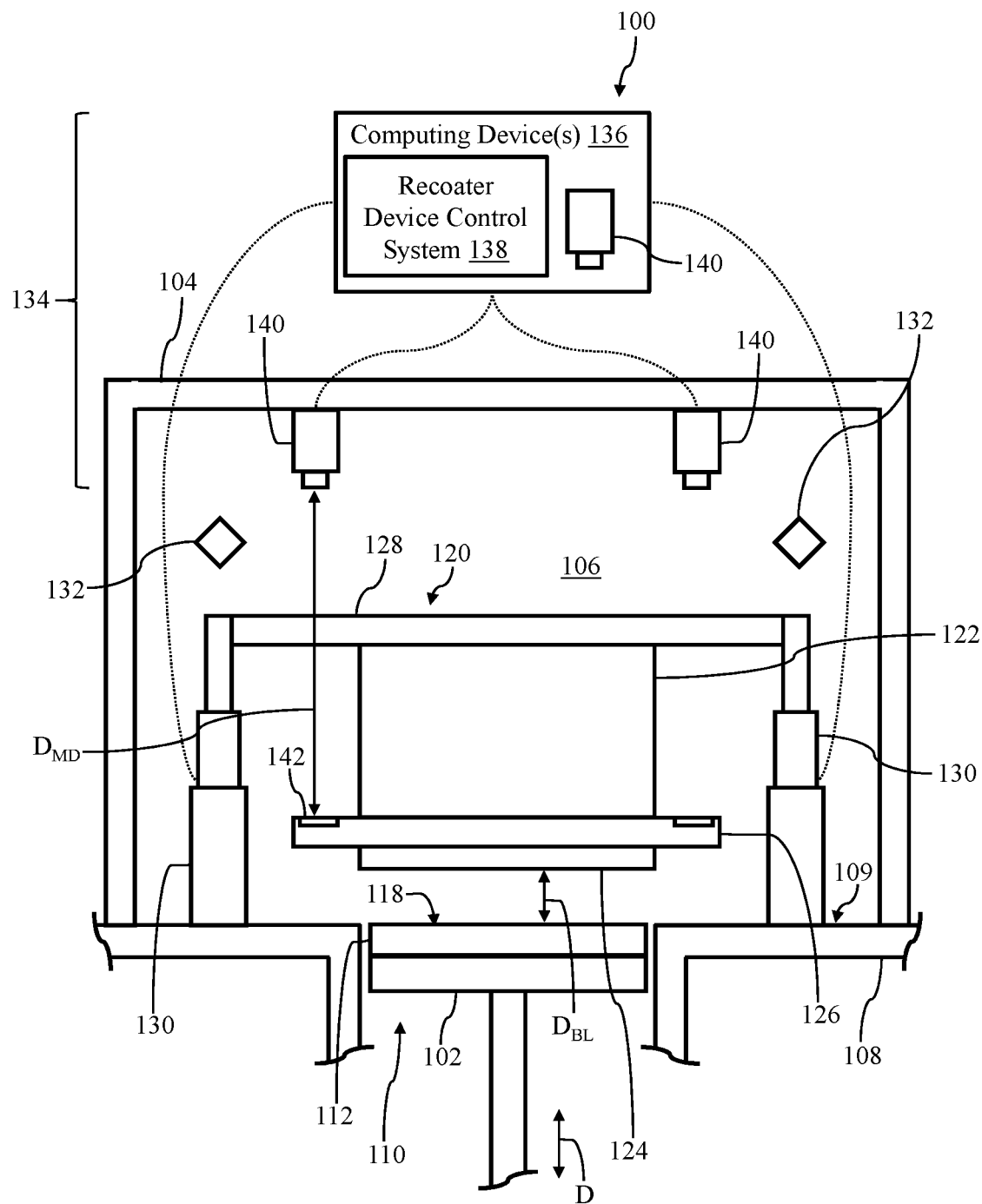
FIG. 3 shows a front view of an additive manufacturing system and a calibration system including cameras positioned above a recoater device of the additive manufacturing system, according to embodiments.
Figure 4:
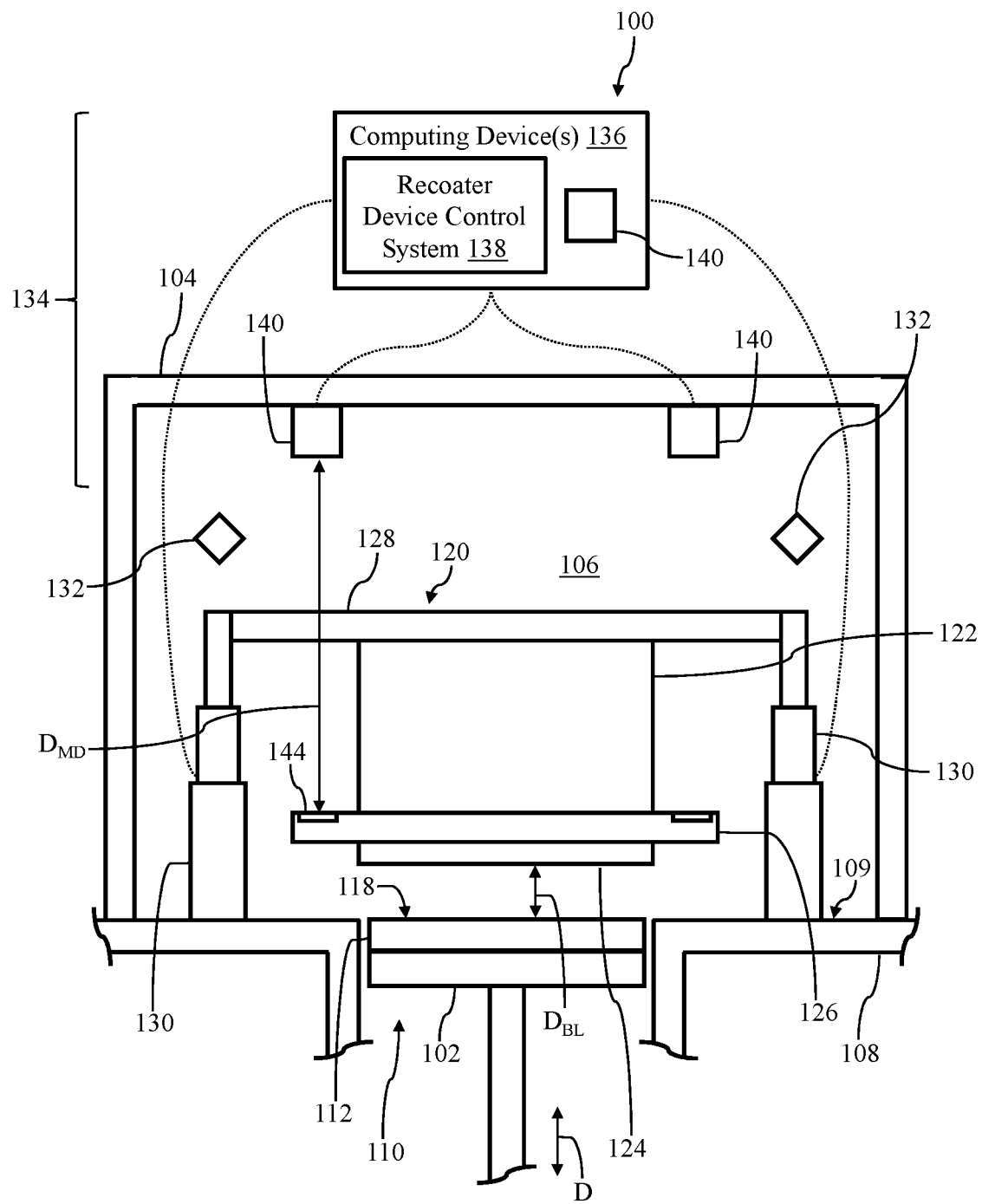
FIG. 4 shows a front view of an additive manufacturing system and a calibration system including emitter-receiver devices positioned above a recoater device of the additive manufacturing system, according to embodiments.

Similar to FIG. 2, FIGS. 3 and 4 depict measurement device(s) 140 of calibration system 134 positioned above recoater device 120 and/or coupled to build chamber 104. However, measurement device(s) 140 in the non-limiting examples shown in FIGS. 3 and 4 may be configured as distinct measurement devices and/or components than proximity sensors shown in FIG. 2.

Turning to FIG. 3, measurement device(s) 140 of calibration system 134 may be configured and/or formed as camera systems including and/or coupled with an illumination systems. Camera systems forming measurement device(s) 140 may be substantially aligned with and/or may view recoater device 120 of AMS 100. That is, recoater device 120, and more specifically, blade holder 126 of recoater device 120, may be substantially aligned with and in the field of view of the camera system forming measurement device(s) 140. In order to determine or measure the distance ($D_{MD}$) between measurement device(s) 140 and blade 124, and/or blade holder 126, the camera system may capture an image of blade and/or blade holder 126, and provide the image to computing device(s) 136 and/or control system 138 of calibration system 134. Computing device(s) 136 and/or control system 138 may analyze the image captured by the camera system to determine the distance ($D_{MD}$). In a non-limiting example, a spatial indicator 142 positioned on blade holder 126, and aligned with and/or visible by the camera system forming measurement device(s) 140. Spatial indicator 142 positioned on blade holder 124 may be any suitable reference, image and/or collection of markings that may be captured in the image taken by the camera system forming measurement device(s) 140 and utilized to measure the distance ($D_{MD}$) between measurement device(s) 140 and blade holder 126.

In the non-limiting example shown in FIG. 4, measurement device(s) 140 of calibration system 134 may be formed as photoelectric sensors. The photoelectric sensors may include a transmitter and receiver component that may be utilized for measuring the distance ($D_{MD}$) between measurement device(s) 140 and blade 124, and/or blade holder 126. In the non-limiting example shown in FIG. 4, AMS 100 may also include a reflective components 144 positioned on blade holder 126, and aligned with respective photoelectric sensors forming measurement device(s) 140. Similar to spatial indicator 142 in FIG. 3, reflective components 144 positioned on blade holder 126 to aid measurement device(s) 140 and/or calibration system 134 in measuring the distance ($D_{MD}$) between measurement device(s) 140 and blade holder 126. For example, reflective components 144 may provide reflective targets for the transmitter component of the photoelectric sensors, and may reflect the transmission (e.g., light) of the photoelectric sensors back toward the receiver component to allow measurement device(s) 140 to measure the distance ($D_{MD}$).

Figure 5:
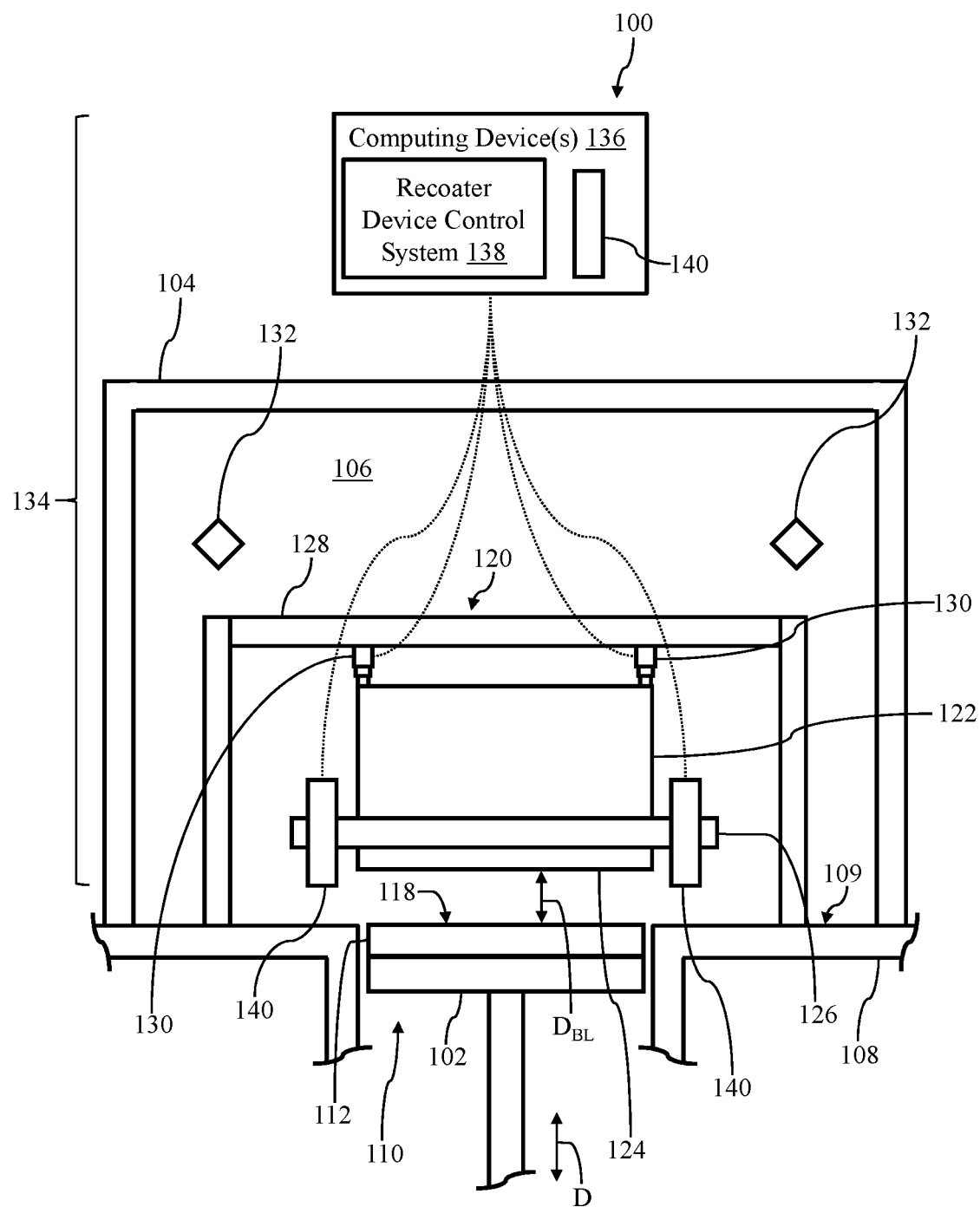
FIG. 5 shows a front view of an additive manufacturing system and a calibration system including proximity sensors coupled to a recoater device of the additive manufacturing system, according to additional embodiments.

FIG. 5 shows a non-limiting example of AMS 100 where actuator(s) 130 are coupled directly to recoater device 120. Specifically, and as shown in FIG. 5, actuator(s) 130 of AMS 100 may be coupled directly to reservoir tank 122 of recoater device 120, and track system 128, respectively. As a result, actuator(s) 130 may couple recoater device 120 to track system 128. In the non-limiting example, actuator(s) 130 may be configured to move (e.g., in-and-out of the page) with recoater device 120 via track system 128 during the build process discussed herein. Calibrating recoater device 120, and specifically adjusting the height of blade 124 and/or recoater device 120, may be accomplished by moving recoater device 120 using actuator(s) 130. Distinct from AMS 100 shown and discussed herein with respect to FIG. 1, in the non-limiting example where actuator(s) 130 are coupled directly to recoater device 120, only recoater device 120 may be moved during the calibration process. That is, track system 128 shown in FIG. 5 may not move in the direction (D) when calibrating recoater device 120 and/or adjusting the height of blade 124; only recoater device 120 may move in the direction (D) as a result of actuating actuator(s) 130.

Although discussed herein as being performed at a pre-build stage, it is understood that the calibration process for calibrating recoater device 120 may be performed during other stages of the building process. In another non-limiting example shown in FIG. 6, the calibration process for calibrating recoater device 120 may be performed at a "mid-build" stage, where a portion of component 146 is formed by AMS 100. That is, the calibration process for calibrating recoater device 120 may be performed at a single mid-build stage, continuously after every single layer is formed by AMS 100, or after a predetermined number of layers of the component are formed by AMS 100. The portion of component 146 may be formed by AMS 100 by undergoing the build process (e.g., depositing powder material, transformation, adjusting build platform 102, and so on) discussed herein with respect to FIG. 1. Additionally, as shown in FIG. 6, a (next) layer of powder material 148 may be deposited on the portion of component 146 built on build surface 118 of build plate 112.

Figure 6:
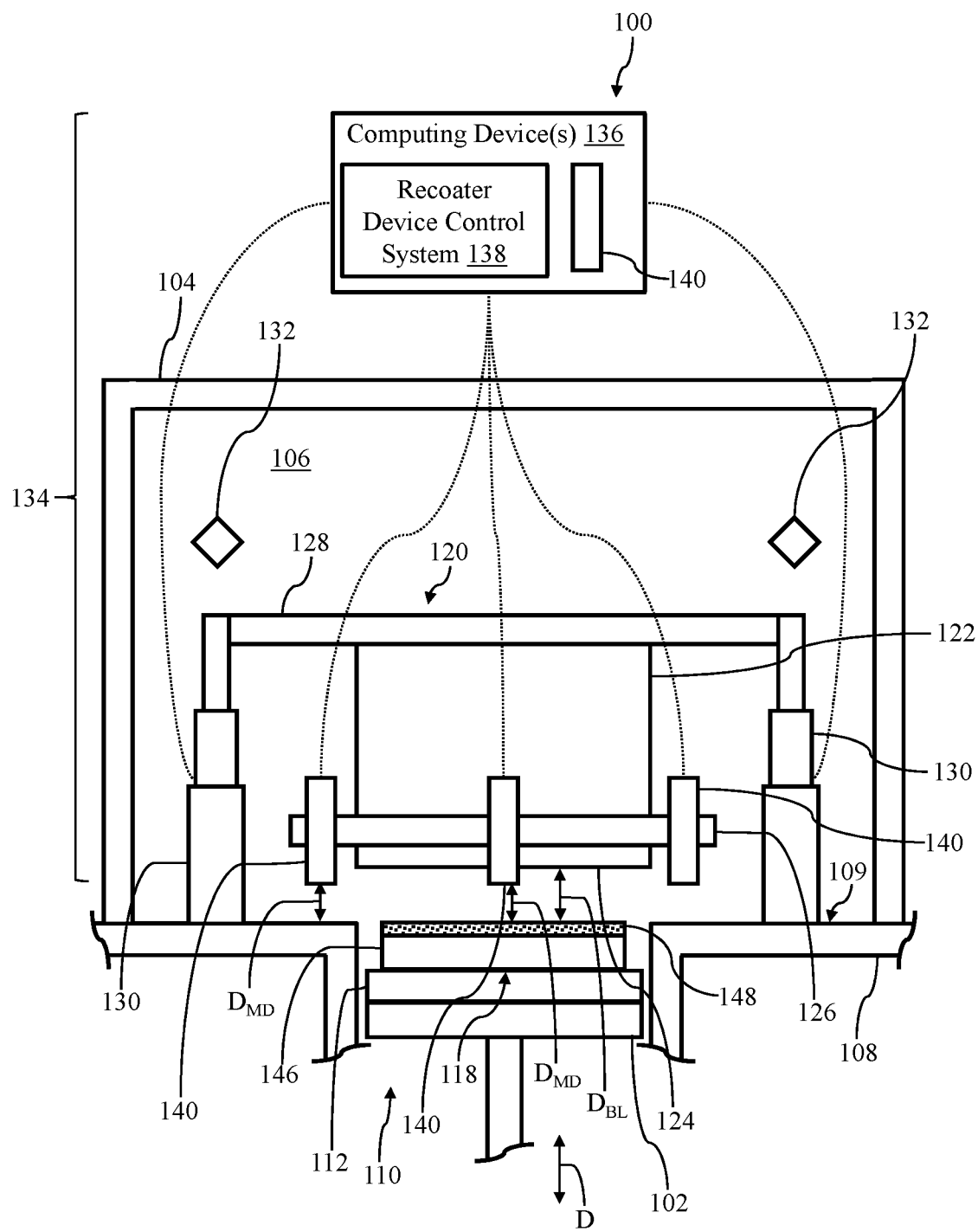
FIG. 6 shows a front view of an additive manufacturing system including a partially built component on a build plate, and a calibration system including proximity sensors coupled to a recoater device of the additive manufacturing system, according to additional embodiments.

In the non-limiting example shown in FIG. 6, calibration system 134 of AMS 100 may perform the calibration process at a mid-build stage in a substantially similar manner as when performing the calibration process at the pre-build stage, as discussed herein. That is, calibration system 134 may calibrate recoater device 120 of AMS 100 at the mid-build stage by performing similar processes as those performed to calibrate recoater device 120 at the pre-build stage. For example, and as discussed herein with respect to FIG. 1, calibration system 134, and its various components, may calibrate recoater device 120 during the mid-build stage by determining the distance ($D_{BL}$), comparing the distance ($D_{BL}$) to the desired distance and adjusting the height of blade 124 and/or recoater device 120.

However, distinct from the pre-build stage, a portion of component 146 may already be formed on build plate 112 in the mid-build stage. As a result, and to allow for additional layers of powder material 148 to be deposited over the portion of component 146 formed on build plate 112, build platform 102 and/or build plate 112 may be moved in a direction (D) below and/or away recoater device 120. In comparison to FIG. 1 (e.g., pre-build stage), in the mid-build stage build shown in FIG. 6, surface 118 of build plate 112 may no longer be aligned with and/or planar with support table 108. Rather, the top or exposed surface of the layer of powder material 148 may be substantially aligned with and/or planar with support table 108. As such, the reference components or portions of AMS 100 used to determine distance ($D_{MD}$) and/or distance ($D_{BL}$) may also vary in the mid-build stage. For example, in the mid-build stage, the distance ($D_{MD}$) measured by measurement device(s) 140 of calibration system 134 may be the distance between measurement device(s) 140 and exposed surface 109 of support table 108 and/or the layer of powder material 148 (e.g., reference surfaces) deposited or disposed over component 146 or build surface 118 of build plate 112. Additionally, mid-build distance ($D_{BL}$) determined using measured distance ($D_{MD}$) to calibrate recoater device 120, may be the distance between blade 124 of recoater device 120 and the layer of powder material 148 disposed over component 146 or build surface 118 of build plate 112. The desired distance may remain the same, numerically or measurable height-wise when performing the calibration process in the mid-build stage. However at the mid-build stage, the desired distance may be the distance between blade 124 of recoater device 120 and the layer of powder material 148 disposed over component 146 or build plate 112, or alternatively, a top layer of the portion of component 146 previously built by AMS 100.

By performing the calibration process for calibrating recoater device 120 in the mid-build stage, it may ensure that recoater device 120 has maintained a desired positioned within AMS 100 to deposit and/or level each layer of powder material 148 to include a desired thickness and/or the surface of the deposited powder material is formed at a desired, and/or predetermined plane for energy emitting device(s) 132. Alternatively, performing the calibration process for calibrating recoater device 120 in the mid-build stage may determine that recoater device 120 needs to be recalibrated (mid-build) to ensure the layers of powder material 148 forming component 146 are leveled and include a desired thickness. This may in turn improve the build quality of component 146 built by AMS 100, as similarly discussed herein.

In another non-limiting example, the distance ($D_{BL}$) between blade 124 of recoater device 120 and a reference surface (e.g., build surface 118 of build plate 112, exposed surface 109 of support table 108, layer of powder material 148 deposited on the portion of component 146, and so on) may also be utilized to calibrate energy emitting device(s) 132. That is, in the non-limiting example AMS 100 may use the determined distance ($D_{BL}$) between blade 124 of recoater device 120 and a reference surface to calibrate energy emitting device(s) 132 to improve the quality of a component built from powder material by AMS 100 by ensuring the energy emitting device(s) 132 are emitting energy at the current and/or detected plane of the deposited powder material to be transformed by energy emitting device(s) 132. In the non-limiting example calibration system 134, and more specifically computing device(s) 136 and/or control system 138, may be in communication with energy emitting device(s) 132 (not shown). AMS 100 may calibrate energy emitting device(s) 132 by using the determined distance ($D_{BL}$) between blade 124 of recoater device 120 and a reference surface to adjust the path of the energy emitted by energy emitting device(s) 132. The energy emitted path may be adjusted based on the determined distance ($D_{BL}$) such that the energy emitted may be equal to and/or emitted at the current and/or detected plane. In the non-limiting example, the path of the energy emitted by energy emitting device(s) 132 may be adjusted by adjusting the position and/or inclination of adjustable mirror(s) 133 of energy emitting device(s) 132 (see, FIG. 1). In this non-limiting example where energy emitting device(s) 132 is calibrated, recoater device 120 may or may not be calibrated and/or the position or height of recoater device 120 may not be adjusted, as discussed herein. That is, only recoater device 120 may be calibrated, only energy emitting device(s) 132 may be calibrated, or both recoated device 120 and energy emitting device(s) 132 may be calibrated as discussed herein.

Figure 7:
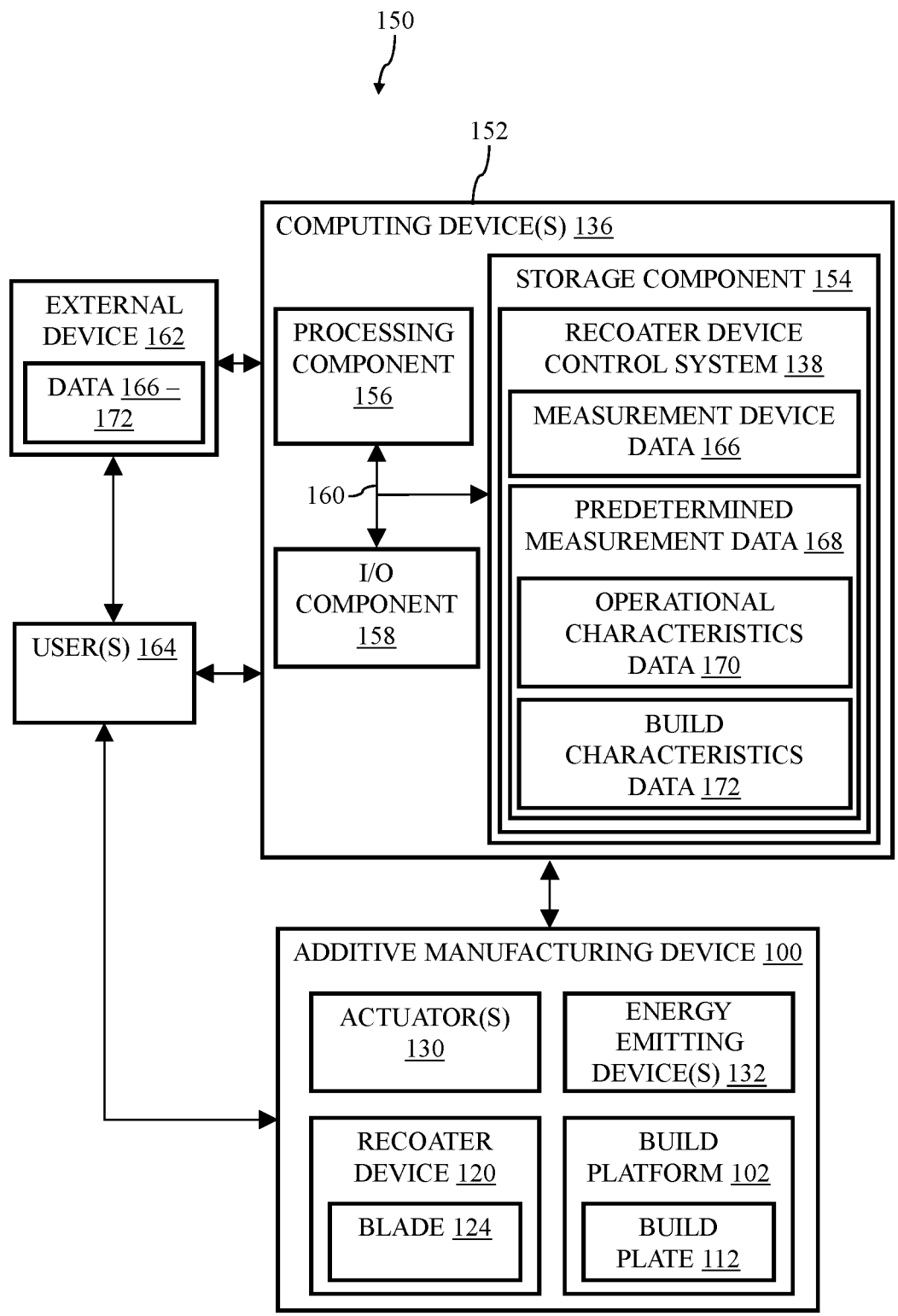
FIG. 7 shows an environment including a calibration system for calibrating a recoater device of the additive manufacturing systems of FIGS. 1-6, according to embodiments.

FIG. 7 shows an illustrative environment 150. To this extent, environment 150 includes computer infrastructure 152 that can perform the various process steps described herein for calibrating recoater device 120 of AMS 100 by adjusting the height of recoater device 120 with respect to a reference surface (e.g., exposed surface 109 of support table 108, build surface 118 of build plate 112. In particular, computer infrastructure 152 is shown including computing device(s) 136 that comprises recoater device control system 138 (hereafter, "control system 138"), which enables computing device(s) 136 to calibrate recoater device 120 of AMS 100 by performing one or more of the process steps of the disclosure.

Computing device(s) 136 is shown including a storage component 154 (e.g., non-transitory computer readable storage medium), a processing component 156, an input/output (I/O) component 158, and a bus 160. Further, computing device(s) 136 is shown in communication with AMS 100, and its various components (e.g., build platform 102, build plate 112, recoater device 120 including blade 124 and so on). As is known, in general, processing component 156 executes computer program code, such as control system 138, that is stored in storage component 154 or an external storage component 162. While executing computer program code, processing component 156 can read and/or write data, such as control system 138, to/from storage component 154 and/or I/O component 158. Bus 160 provides a communications link between each of the components in computing device(s) 136. I/O component 158 can comprise any device that enables a user 164 to interact with computing device(s) 136 or any device that enables computing device(s) 136 to communicate with one or more other computing devices. Input/output components 158 (including but not limited to keyboards, displays, pointing devices, etc.) can be coupled to the system either directly or through intervening I/O controllers.

In any event, computing device(s) 136 can comprise any general purpose computing article of manufacture capable of executing computer program code installed by a user 164 (e.g., a personal computer, server, handheld device, etc.). However, it is understood that computing device(s) 136 and control system 138 are only representative of various possible equivalent computing devices that may perform the various process steps of the disclosure. To this extent, in other embodiments, computing device(s) 136 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 152 is only illustrative of various types of computer infrastructures for implementing the disclosure. For example, in one embodiment, computer infrastructure 152 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed herein, control system 138 enables computing infrastructure 152 to control operation of AMS 100. To this extent, control system 138 is shown including measurement device data 166, predetermined measurement data 168, operational characteristics data 170, and build characteristics data 172. Measurement device data 166 may include program code related to determining, measuring and/or detecting distances between blade 124 of recoated device 120 and build plate 112 (see, FIG. 1). Predetermined measuring data 168 may include program code related to predetermined, desired distances between blade 124 and build plate 112 during the build process, as discussed herein. Operational characteristics data 170 may include program code related to the operation and/or control of AMS 100, and specifically components of AMS 100 including build platform 102, recoater device 120, energy emitting device(s) 130 and the like.

Build characteristics data 172 may include program code related to the component intended to be built by AMS 100, which may include information and/or data specific to the features, geometry and/or layers of the component, as discussed herein. Additionally operation of each of these data 166-172 is discussed further herein. However, it is understood that some of the various data shown in FIG. 7 can be implemented independently, combined, and/or stored in memory for one or more separate computing devices that are included in computer infrastructure 152. Further, it is understood that some of the data and/or functionality may not be implemented, or additional data and/or functionality may be included as part of environment 150. In a non-limiting example, various data 166-172 may be stored on external storage device 162.

As discussed herein, build characteristics data 172 may include program code related to the component intended to be built by AMS 100, which may include information and/or data specific to the features, geometry and/or layers of the component. The program code of build characteristics data 172 may include a precisely defined 3D model of the component and can be generated from any of a large variety of well-known computer aided design (CAD) software systems such as AutoCAD®, TurboCAD®, DesignCAD 3D Max, etc. In this regard, the program code of build characteristics data 172 can take any now known or later developed file format. For example, the program code of build characteristics data 172 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. The program code of build characteristics data 172 may be translated between different formats, converted into a set of data signals and transmitted, received as a set of data signals and converted to code, stored, etc., as necessary. The program code of build characteristics data 172 may be an input to computing device(s) 136 and/or storage component 154, and may come from a part designer, an intellectual property (IP) provider, a design company, user(s) 164 of computing device(s) 136, external storage device 162, or from other sources. As discussed herein, computing device(s) 136 and/or control system 138 executes the program code of build characteristics data 172, and divides the component into a series of defined layers, which may be individually transformed after formation by energy emitting device 130 to form the component.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtaining measurement device data 166, obtaining build characteristics data 172 for component, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An additive manufacturing system comprising:
    a build plate positioned directly on a movable build platform and positioned within a build chamber, the build plate configured to receive a powder material;
    a recoater device positioned above the build plate, the recoater device including a blade; and
    a calibration system operably connected to the recoater device, the calibration system including:
        at least one measurement device coupled to the build chamber, the at least one measurement device positioned above and substantially aligned with the recoater device; and at least one computing device operably connected to the at least one measurement device, the at least one computing device configured to calibrate the recoater device by:
adjusting a height of the blade of the recoater device relative to a reference surface in response to determining a pre-build distance between the blade of the recoater device and the reference surface differs from a desired distance,
wherein the pre-build distance is determined using the at least one measurement device.

2. The additive manufacturing system of claim 1, wherein the reference surface includes at least one of:
a build surface of the build plate,
a surface of the movable build platform, or
an exposed surface of a support table substantially surrounding the movable build platform.

3. The additive manufacturing system of claim 1, wherein the at least one computing device is configured to adjust the height of the blade of the recoater device by:
altering the height of the blade of the recoater device until the pre-build distance between the blade of the recoater device and the reference surface is identical to the desired distance.

4. The additive manufacturing system of claim 1, further comprising:
a track system coupled to the recoater device, the track system configured to move the recoater device over the build plate; and
an actuator coupled to one of the track system or the recoater device.

5. The additive manufacturing system of claim 4, wherein the at least one computing device is operably connected to the actuator and is configured to adjust the height of the blade of the recoater device by:
actuating the actuator until the pre-build distance between the blade of the recoater device and the reference surface is identical to the desired distance.

6. The additive manufacturing system of claim 1, wherein the at least one computing device is configured to calibrate the recoater device by:
calculating the desired distance between the blade of the recoater device and the reference surface based on at least one of:
operational characteristics of at least one energy emitting device positioned above the build plate, or
build characteristics of a component formed on the build plate from the powder material.

7. The additive manufacturing system of claim 1, wherein the at least one measurement device of the calibration system includes at least one of:
at least one proximity sensor coupled to the recoater device,
at least one proximity sensor positioned above the recoater device, or
at least one camera positioned above the recoater device.

8. The additive manufacturing system of claim 1, wherein the at least one computing device is configured to calibrate the recoater device by:
adjusting the height of the blade of the recoater device relative to the reference surface in response to determining a mid-build distance between the blade of the recoater device and a layer of the powder material disposed over the build plate differs from the desired distance,
wherein the mid-build distance is determined using the at least one measurement device.

9. The additive manufacturing system of claim 1, wherein the at least one computing device is configured to:
alter a position of at least one mirror of at least one energy emitting device based on the determined, pre-build distance between the blade of the recoater device and the reference surface.

10. A calibration system operably connected to a recoater device of an additive manufacturing system, the calibration system comprising:
at least one measurement device coupled to a build chamber, the at least one measurement device positioned above and substantially aligned with the recoater device; and
at least one computing device operably connected to the at least one measurement device, the at least one computing device configured to calibrate the recoater device by:
adjusting a height of a blade of the recoater device relative to a reference surface of the additive manufacturing system in response to determining a pre-build distance between the blade of the recoater device and the reference surface differs from a desired distance,
wherein the pre-build distance is determined using the at least one measurement device.

11. The calibration system of claim 10, wherein the reference surface of the additive manufacturing system includes at least one of:
a build surface of a build plate,
a surface of a movable build platform, or
an exposed surface of a support table substantially surrounding the movable build platform.

12. The calibration system of claim 10, wherein the at least one computing device is configured to adjust the height of the blade of the recoater device by:
altering the height of the blade of the recoater device until the pre-build distance between the blade of the recoater device and the reference surface is identical to the desired distance.

13. The calibration system of claim 10, wherein the at least one computing device is configured to adjust the height of the blade of the recoater device by:
actuating an actuator in communication with the recoater device until the pre-build distance between the blade of the recoater device and the reference surface is identical to the desired distance, the actuator operably connected to the at least one computing device.

14. The calibration system of claim 10, wherein the at least one computing device is configured to calibrate the recoater device by:
calculating the desired distance between the blade of the recoater device and the reference surface based on at least one of:
operational characteristics of at least one energy emitting device of the additive manufacturing system positioned above the recoater device, or
build characteristics of a component formed by the additive manufacturing system.

* * * * *